US005435220A

United States Patent [19]

Pultz

[11] Patent Number: 5,435,220

[45] Date of Patent: Jul. 25, 1995

[54] STORAGE AND RETRIEVAL OF DRUMSTICKS

[76] Inventor: Richard Pultz, 330 NW. 35th St., Apt. #1, Pompano Beach, Fla. 33064

[21] Appl. No.: 48,107

[22] Filed: Apr. 15, 1993

[51] Int. Cl.[6] .............................................. G01D 3/00

[52] U.S. Cl. ........................................ 84/329; 84/453; 206/314; 224/910

[58] Field of Search .................. 84/411 R, 421, 422.4, 84/453, 329; 206/249, 255, 314; 224/232, 910

[56] References Cited

U.S. PATENT DOCUMENTS

D. 319,836 9/1991 Clouse et al. ..................... 84/329 X
4,531,443 7/1985 Gillis, Jr. .............................. 84/329
4,558,516 12/1985 Collins ........................... 224/232 X
5,117,724 9/1992 Gardner ................................ 84/421
5,199,621 4/1993 McLennan ...................... 224/910 X

*Primary Examiner*—Richard A. Wintercorn
*Assistant Examiner*—Patrick J. Stanzione
*Attorney, Agent, or Firm*—Joseph Zallen

[57] ABSTRACT

A device for storing and retrieving one or more drumsticks, comprising in combination: a casing open at its top and defining a cavity, a drumstick support movable within the cavity in opposition to a first spring into locking engagement with a second spring, and trigger means for releasing the second spring; said device being characterized in that releasing the second spring causes said drumstick support means to move upwardly ejecting said drumsticks.

2 Claims, 3 Drawing Sheets

15
15a
16
17
18
19
20
23
24
25
26
27

STORAGE AND RETRIEVAL OF DRUMSTICKS

BACKGROUND OF INVENTION

This invention relates to a novel device which will enable a drummer to readily store or retrieve drumsticks as needed.

Musicians who play drums often have difficulty in storing drumsticks when not in use and then retrieving them. This is particularly a problem with drumsticks in a marching band.

Prior art devices for marching drummers are typically uncomfortable, awkward, or expensive. Streit, U.S. Pat. No. 4,256,007, describes a drum carrier supported on the shoulder by hooks on a rigid frame but with no provision to store drumsticks. Johannsen, U.S. Pat. No. 3,106,123, describes a complex of straps as a marching drum holder, but makes no provision for storing of drumsticks. Gardner, U.S. Pat. No. 5,117,724, describes a drumstick carrier in the form of a stick bag with pockets.

One object of this invention is to provide a device which permits quick storage and retrieval of drumsticks.

Another object of this invention is to provide such a device suitable for use by a marching drummer.

Other objects and advantages of the present invention will be apparent from the description and claims which follow taken together with the appended drawings.

SUMMARY OF INVENTION

This invention comprises broadly a rigid casing containing a cavity open at one end and of sufficient length to house one or more drumsticks. Within the cavity is a movable drumstick support member. Inserting the drumstick into the cavity against the drumstick support causes the support to both load a first spring and lock to a second spring. Release of the second spring causes the first spring to push the support outwardly, thus ejecting the drumsticks from the cavity opening.

The device of this invention can be attached to the waist and thigh of a marching drummer for ease of use without interfering with holding the drum and leaving his hands free. It also can be attached to a stand or drum itself.

SPECIFIC EXAMPLE OF INVENTION

Figure 1:
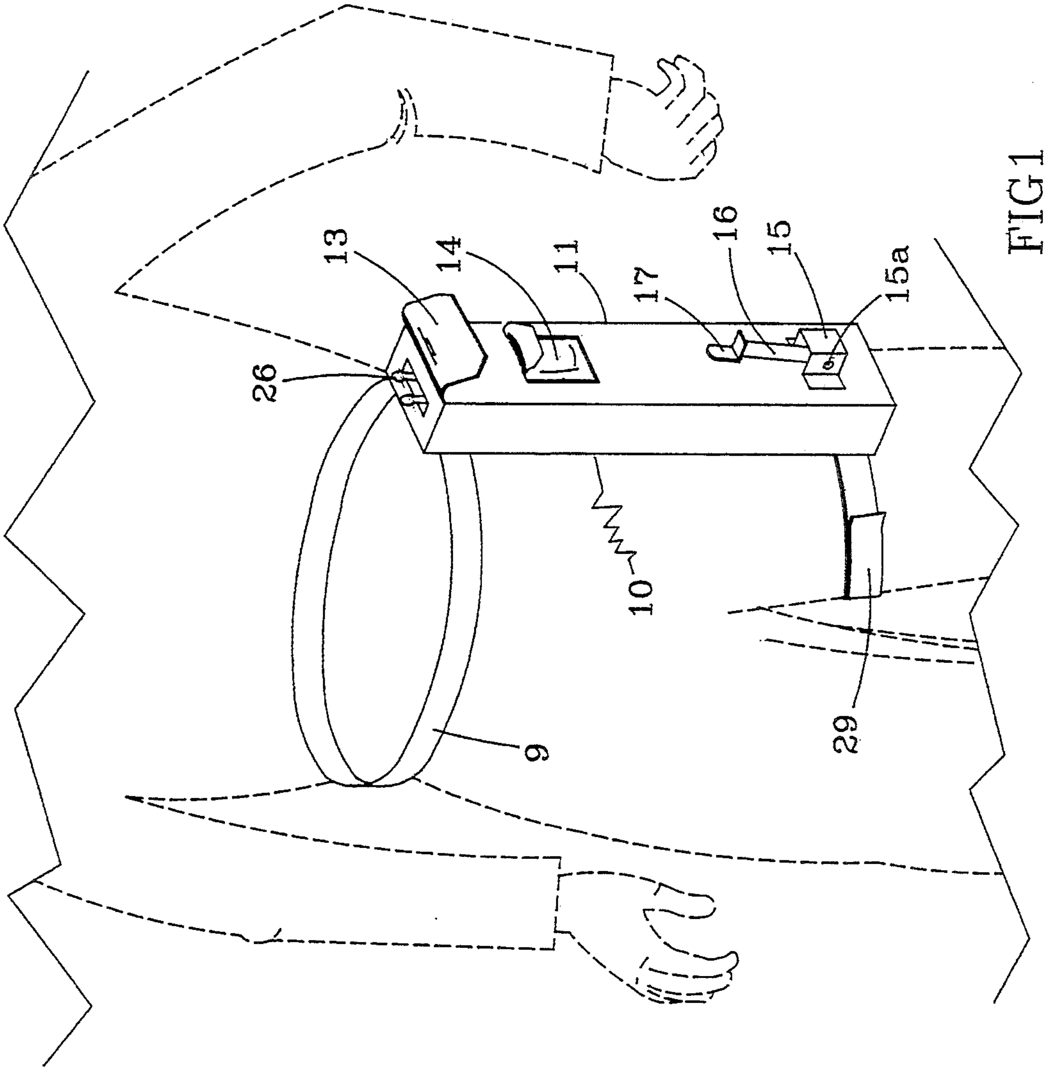
FIG. 1 is a perspective view of one embodiment of the invention worn around the waist of a phantom drummer with a belt.
Figures 2, 3, 4:
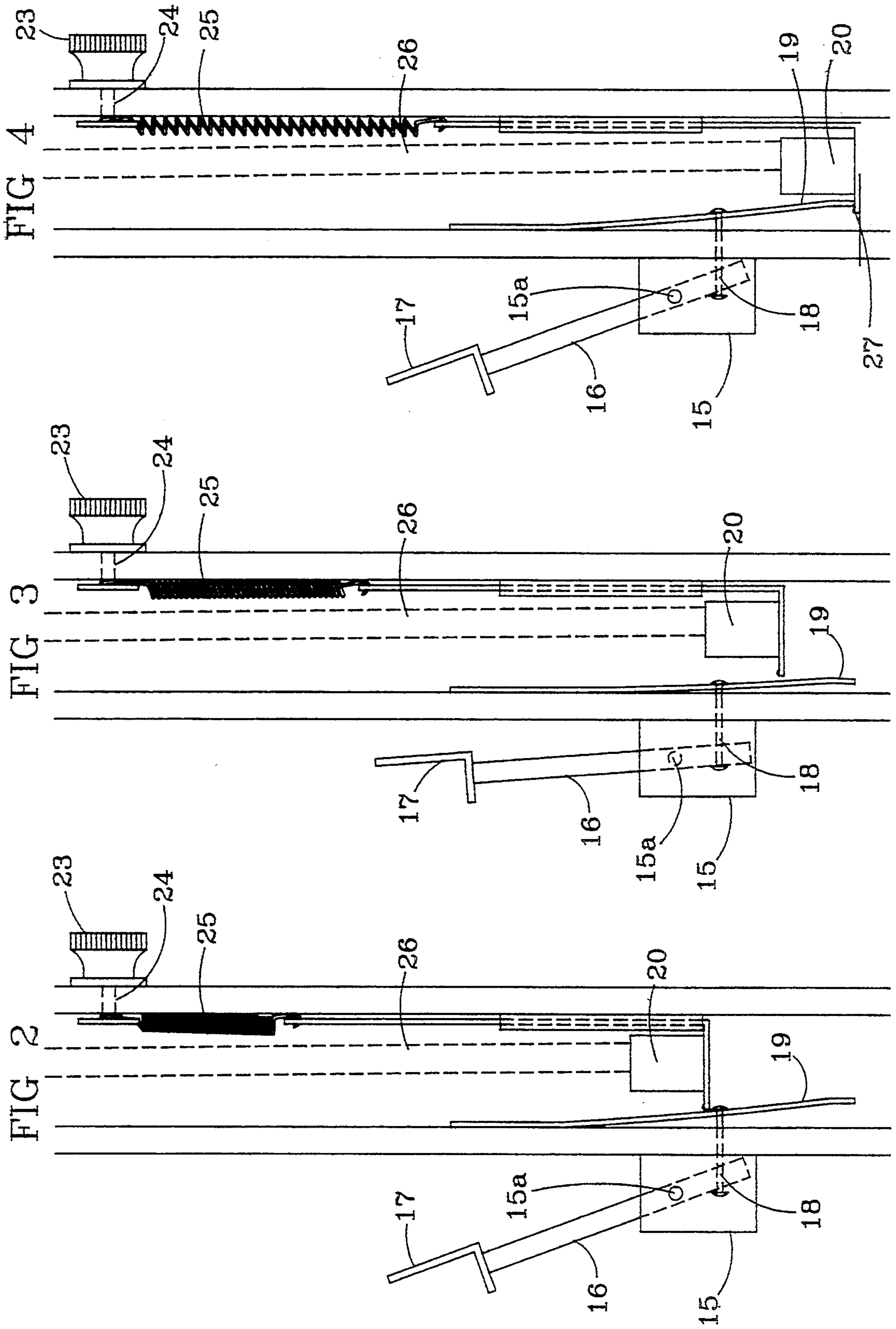
FIG. 2 is a partial longitudinal section of the invention ready to receive a pair of drumsticks.
FIG. 3 is a view as in FIG. 2 wherein the drumsticks have been partially inserted.
FIG. 4 is a view as in FIG. 2 wherein the drumsticks have been fully inserted into locked position.
Figure 5:
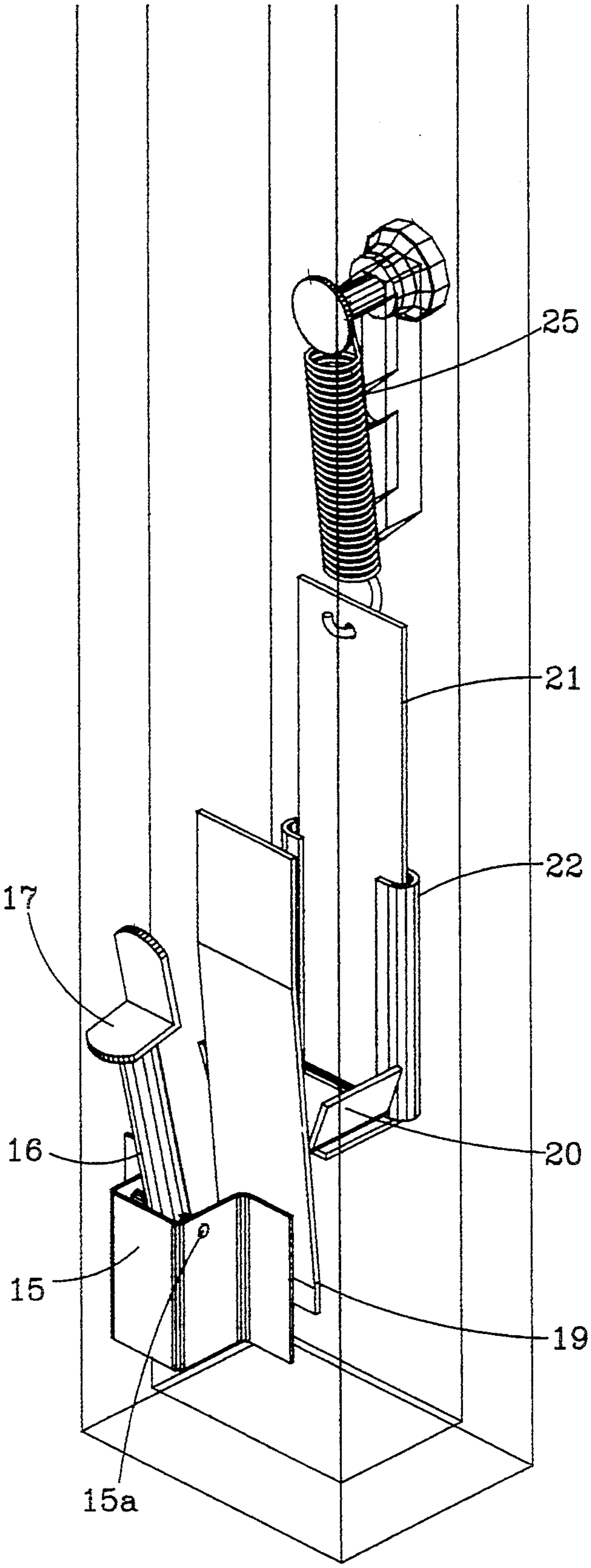
FIG. 5 is an interior view of the mechanism of the invention.
Figure 6:
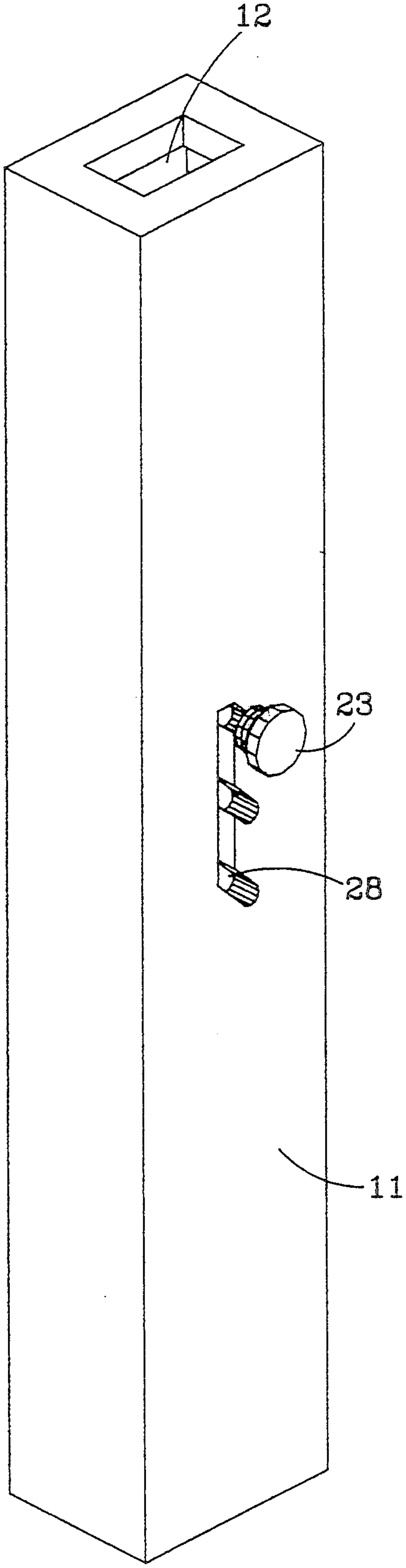
FIG. 6 is a rear perspective view of the invention.

Referring now to the drawings, the device indicated generally by numeral 10 comprises a stiff casing 11 covered with leather or other ornamental material, having a cavity with an opening 12, cover 13, and a pocket 14 for holding a drum key. Two drumsticks 26 are shown inserted into the device. The device is shown worn by a phantom drummer with an elastic strap 9 on his waist and a Velcro strap 28 on his thigh.

The device is operated by means of a trigger 16 having a finger-engaging portion 17, the trigger 16 being pivotal on pin 15*a* of support bracket 15. Trigger 16 pulls the end of pin 18 which in turn pulls leaf spring 19 out of engagement with crevice 27. Track 22 attached to casing 11 holds bent plate 21 and permits it to slide longitudinally. The end of plate 21 is attached to coil spring 25 whose other end is attached to a pin 24 held in place on the casing by a removable cap 23 which permits adjusting the tension of spring 25 by moving the pin 24 to a selected slot 28. The normal position of coil spring 25 is retracted.

Sliding plate 21 has a bent-over portion attached to an outward facing bent plate 20 which serves to engage the ends of drumsticks 26.

The mechanism operates as follows: When the drumsticks 26 are pushed through the top opening 12, they push against plate 20 which in turn causes plate 21 to move down until it pushes its crevice 27 to engage leaf spring 19. At this point, coil spring 25 is extended and under tension. A touch on the finger portion 17 of trigger 16 causes the trigger to pull pin 18 and thus leaf spring 19 away from plate 21. This causes coil spring 25 to retract, moving bent plate 20 upwardly so as to eject the drumsticks 26.

I claim:

1. A device for storing and retrieving one or more drumsticks, comprising in combination: a casing containing a cavity open at one end, drumstick support means movable within the cavity to cause tension on a first spring means and to go into locking engagement with a second spring means, and trigger means for releasing said second spring means; said device being characterized in that releasing said second spring means causes said drumstick support means to move upwardly ejecting said drumsticks.

2. A device for storing and retrieving one or more drumsticks, comprising in combination: a casing (11) having a cavity with an opening (12) at one end; said cavity containing a track (22) attached to the casing, a plate (21) slidable in the track and having a portion carrying a drumstick support (20), tension-adjustable spring means (25) connected to said plate (21), a second spring means (19) attached to casing (11) and whose free end is engageable with plate (21), and means (16) for pulling the second spring means (19) out of engagement with plate (21); said device being so constructed that insertion of a drumstick (26) into the cavity applies tension to said spring means (25), pushes support plate (20) down until plate (21) locks onto said second spring means (19) and operation of said trigger means (16) disengages said second spring means (19) wherein the action of said spring means (25) causes the drumstick support (20) to rise, thus ejecting the drumsticks.

* * * * *